(12) United States Patent
Marica

(10) Patent No.: US 8,757,592 B2
(45) Date of Patent: Jun. 24, 2014

(54) POPPET VALVE FOR PUMP SYSTEMS WITH NON-RIGID CONNECTOR TO FACILITATE EFFECTIVE SEALING

(75) Inventor: Adrian Marica, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 495 days.

(21) Appl. No.: 13/050,351

(22) Filed: Mar. 17, 2011

(65) Prior Publication Data

US 2011/0180740 A1 Jul. 28, 2011

Related U.S. Application Data

(63) Continuation-in-part of application No. 12/288,167, filed on Oct. 16, 2008, now abandoned.

(51) Int. Cl.
*F16K 31/00* (2006.01)

(52) U.S. Cl.
USPC .......................................... 251/294; 251/321

(58) Field of Classification Search
USPC ............. 251/294, 333, 363, 321, 85; 137/538
See application file for complete search history.

(56) References Cited

U.S. PATENT DOCUMENTS

| | | | |
|---|---|---|---|
| 1,990,557 A | 2/1935 | Melott | 251/127 |
| 2,380,866 A | 7/1945 | Overbeke | 138/30 |
| 2,605,080 A | 7/1952 | Rea | 251/128 |
| 3,050,943 A | 8/1962 | Thorel et al. | 60/52 |
| 3,053,500 A | 9/1962 | Atkinson | 251/332 |
| 3,066,700 A | 12/1962 | Mercier | 138/30 |
| 3,409,038 A | 11/1968 | Blackford | 137/516.15 |
| 3,447,777 A * | 6/1969 | Carlson | 251/144 |
| 3,537,679 A * | 11/1970 | Bulnes et al. | 251/144 |
| 3,658,138 A | 4/1972 | Gosselin | 173/1 |
| 3,934,608 A | 1/1976 | Guyton | 137/527.8 |
| 3,967,809 A * | 7/1976 | Skantar | 251/61 |
| 4,088,154 A | 5/1978 | Patton et al. | 138/30 |
| 4,174,725 A * | 11/1979 | LaPere | 137/68.14 |
| 4,180,097 A | 12/1979 | Sjoberg | 137/516.29 |
| 4,195,668 A | 4/1980 | Lewis | 138/30 |
| 4,201,241 A | 5/1980 | Schertler | 137/527 |
| 4,203,468 A * | 5/1980 | Dietz | 137/624.11 |
| 4,242,057 A | 12/1980 | Bender | 417/404 |
| 4,295,366 A | 10/1981 | Gibson et al. | 73/155 |
| 4,296,770 A * | 10/1981 | Rice | 137/62 |
| 4,338,689 A * | 7/1982 | Zieg | 4/378 |
| 4,477,237 A | 10/1984 | Grable | 417/539 |
| 4,487,222 A | 12/1984 | Crawford | 137/516.29 |
| 4,518,329 A | 5/1985 | Weaver | 417/566 |
| 4,527,959 A | 7/1985 | Whiteman | 417/342 |
| 4,573,886 A | 3/1986 | Maasberg et al. | 417/454 |

(Continued)

OTHER PUBLICATIONS

Drilling Equipment, Hydraulic Mud Pump: Maritime Hydraulics General Catalogue; 3 pp, 1993-94.

(Continued)

*Primary Examiner* — John K Fristoe, Jr.
*Assistant Examiner* — Andrew J Rost
(74) *Attorney, Agent, or Firm* — Amerson Law Firm, PLLC

(57) ABSTRACT

An illustrative valve is disclosed that includes a valve body with a valve seat and a valve member adapted to sealingly engage the valve seat. The valve also includes an actuator operatively coupled to the valve member via a non-rigid connector, wherein the actuator is adapted for selectively moving the valve member relative to the valve seat.

12 Claims, 13 Drawing Sheets

(56) References Cited

U.S. PATENT DOCUMENTS

| | | | |
|---|---|---|---|
| 4,618,316 A | 10/1986 | Elliott | 417/454 |
| 4,676,724 A | 6/1987 | Birdwell | 417/342 |
| 4,770,206 A | 9/1988 | Sjoberg | 137/516.29 |
| 4,815,698 A * | 3/1989 | Palmer | 251/85 |
| 4,854,397 A | 8/1989 | Warren et al. | 175/26 |
| 4,860,995 A | 8/1989 | Rogers | 251/356 |
| 4,995,465 A | 2/1991 | Beck et al. | 175/27 |
| 5,059,101 A | 10/1991 | Valavaara | 417/569 |
| 5,063,776 A | 11/1991 | Zanker et al. | 73/155 |
| 5,088,521 A | 2/1992 | Johnson | 137/516.29 |
| 5,175,455 A | 12/1992 | Penicaut | 310/12 |
| 5,193,577 A | 3/1993 | de Koning | 137/516.29 |
| 5,226,445 A | 7/1993 | Surjaatmadja | 137/516.29 |
| 5,253,987 A | 10/1993 | Harrison | 417/566 |
| 5,320,136 A | 6/1994 | Morris et al. | 137/528 |
| 5,462,254 A * | 10/1995 | Muller | 251/144 |
| 5,465,799 A | 11/1995 | Ho | 75/61 |
| 5,522,423 A | 6/1996 | Elliott | 137/515.7 |
| 5,616,009 A | 4/1997 | Birdwell | 417/342 |
| 5,678,802 A * | 10/1997 | Lunder | 251/294 |
| 5,823,093 A | 10/1998 | Kugelev et al. | 92/128 |
| 5,910,691 A | 6/1999 | Wavre | 310/12 |
| 5,960,700 A | 10/1999 | Staggs et al. | 92/240 |
| 6,000,417 A | 12/1999 | Jacobs | 137/2 |
| 6,050,348 A | 4/2000 | Richarson et al. | 175/26 |
| 6,056,013 A | 5/2000 | Saski et al. | 138/31 |
| 6,102,673 A | 8/2000 | Mott et al. | 417/392 |
| 6,244,295 B1 | 6/2001 | Bartussek et al. | 137/540 |
| 6,257,354 B1 | 7/2001 | Schrader et al. | 175/38 |
| 6,293,517 B1 | 9/2001 | Cunningham | 251/315.02 |
| 6,581,632 B2 | 6/2003 | Walpole et al. | 137/512.1 |
| 6,802,378 B2 | 10/2004 | Haci et al. | 175/26 |
| 6,864,647 B2 | 3/2005 | Duncan et al. | 318/114 |
| 6,874,540 B2 | 4/2005 | Lee | 138/31 |
| 6,918,453 B2 | 7/2005 | Haci et al. | 175/26 |
| 6,923,422 B2 * | 8/2005 | Schmaltz | 251/7 |
| 6,944,547 B2 | 9/2005 | Womer et al. | 702/7 |
| 6,955,339 B1 | 10/2005 | Blume | 251/318 |
| 6,960,858 B2 | 11/2005 | Kawai | 310/181 |
| 7,168,440 B1 | 1/2007 | Blume | 137/15.18 |
| 7,374,147 B2 * | 5/2008 | Nohl et al. | 251/129.04 |
| 7,533,692 B2 | 5/2009 | Walpole et al. | 137/533.27 |
| 2004/0219040 A1 | 11/2004 | Kugelev et al. | 417/415 |
| 2005/0139266 A1 | 6/2005 | Partridge | 137/527.8 |
| 2009/0032764 A1 | 2/2009 | Morreale | 251/366 |
| 2010/0098568 A1 | 4/2010 | Marica | 417/559 |

OTHER PUBLICATIONS

Hex Pump The Next Generation in Mud Pump Technology; National Oilwell Varco; 6 pp, 2005.

Offshore Triplex Pumps, Premium "P" Series; National Oilwell Varco; 4 pp, 2006.

How to Treat Your Type "P" Triple Mud Pump; National Oilwell; Cover and pp. 1-49, 2002.

Explosion Relief Valves: Efficient Protection for Man and Machine; Hoerbiger; 7pp, 2004.

PCT/US2009/59612 International Search Report, Dec. 4, 2009.

* cited by examiner

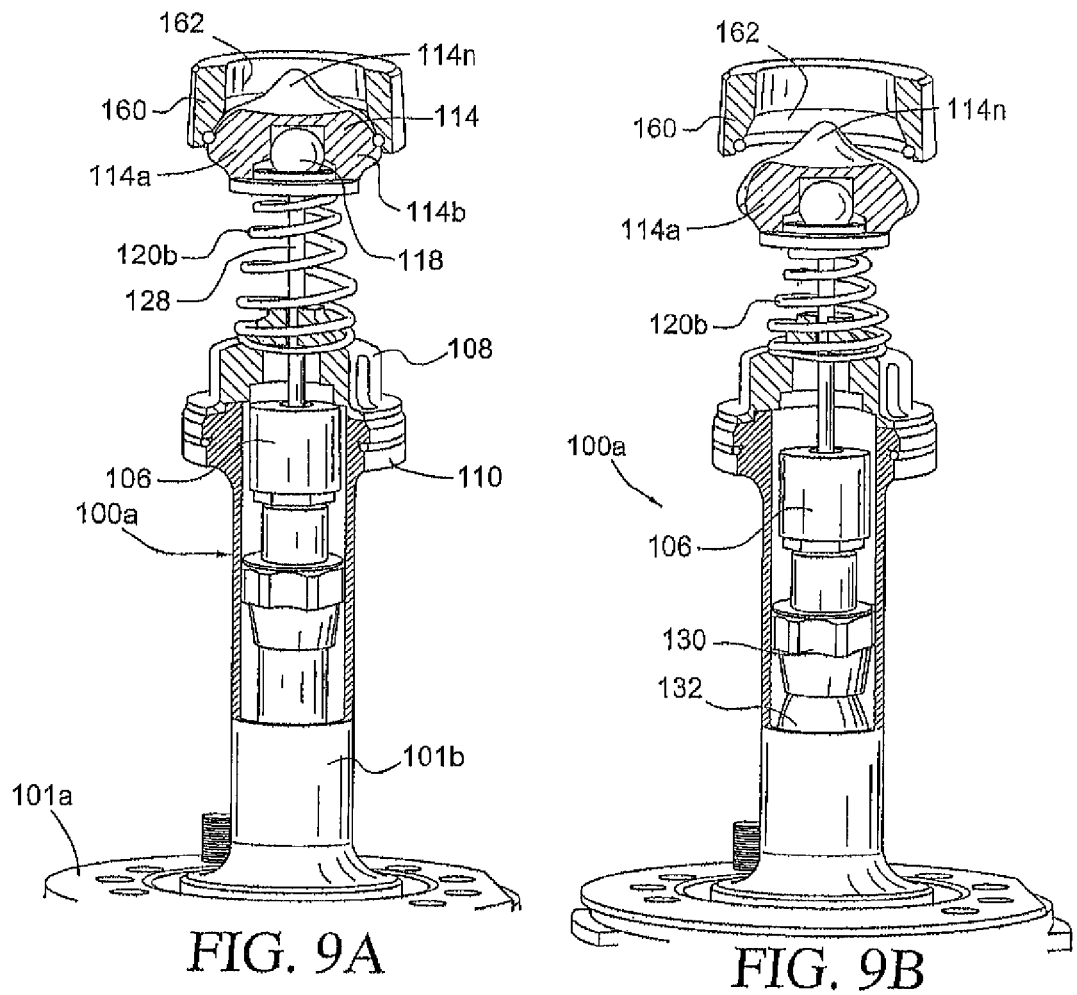
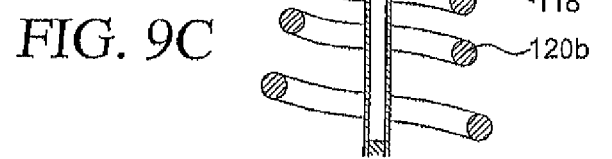
FIG. 9A  FIG. 9B
FIG. 9C

POPPET VALVE FOR PUMP SYSTEMS WITH NON-RIGID CONNECTOR TO FACILITATE EFFECTIVE SEALING

CROSS-REFERENCE TO RELATED APPLICATIONS

This application is a continuation-in-part of application Ser. No. 12/288,167, filed Oct. 16, 2008 now abandoned, which is incorporated fully herein by reference.

BACKGROUND OF THE DISCLOSURE

1. Field of the Disclosure

This present disclosure is directed to drilling wellbores in the earth, to systems for pumping drilling fluid ("mud") for such operations, to mud pumping systems and valves for them, and to a poppet valve that has a non-rigid connector to facilitate effective sealing, and methods of their use.

2. Description of Related Art

The prior art discloses a wide variety of drilling systems, apparatuses, and methods including, but not limited to, the disclosures in U.S. Pat. Nos. 6,944,547; 6,918,453; 6,802,378; 6,050,348; 5,465,799; 4,995,465; 4,854,397; and 3,658,138, all incorporated fully herein for all purposes. The prior art discloses a wide variety of drilling fluid pumps ("mud pumps") used in drilling operations and pump systems, for example, and not by way of limitation, those pumps and systems disclosed in U.S. Pat. Nos. 6,257,354; 4,295,366; 4,527,959; 5,616,009; 4,242,057; 4,676,724; 5,823,093; 5,960,700; 5,059,101; 5,253,987; in U.S. application Ser. No. 10/833,921 filed Apr. 28, 2004(all said U.S. references incorporated fully herein for all purposes).

A drill bit carried at an end of a drillstring is rotated to form wellbores in the earth. Certain drillstrings include tubulars which may be drill pipe of jointed sections or a continuous coiled tubing and a drilling assembly that has a drill bit at its bottom end. The drilling assembly is attached to the bottom end of the tubing or drillstring. In certain systems, to drill a wellbore, the drill bit is rotated (e.g., by a top drive, a power swivel, a rotary table system, or by a downhole mud motor carried by the drilling assembly). Drilling fluid, also referred to as "mud," is pumped through the wellbore under pressure from a pit or container at the surface by a pumping system at the surface.

In certain known mud pump systems, suction and discharge modules have valves therein that selectively control fluid flow through the module in an intake (suction) mode in which piston apparatus creates a vacuum drawing drilling fluid into the module and in an output mode (Discharge) in which the piston apparatus creates pressure forcing drilling fluid out of the module. In the suction mode, a suction valve opens allowing drilling fluid into the module while a discharge valve remains closed. In the discharge mode, the pressure of the drilling fluid closes the suction valve and opens the discharge valve.

Both valves, the suction valve and the discharge valve, are subjected to the erosive and damaging effects of the flow of drilling fluid. The drilling fluid contains drilled cuttings and debris which can erode valve parts (e.g. seats, stems, valve members, seals, guide bushings, insert, liners, wear plates etc.). Also, mud pumps which can pump relatively hot drilling fluid at, e.g., 500 to 2000 gallons per minute, force the erosive drilling fluid against the valve parts at high velocities which add to the fluid's damaging effects.

In many valves used in mud pump systems, a guide in the valve which is disposed across a flow path or guide fingers extending from a valve member into a valve seat guide a valve member so that valve member seats correctly and effectively against the valve seat. In many valves, the valve seat surface against which the valve member (or poppet) seats is, ideally, flat; and the surface of the valve member which sealingly abuts the flat seat surface of the valve seat is, correspondingly, and ideally, flat. A guide or guide fingers facilitate correct seating of the valve member's flat seating surface against the valve seat's flat seat surface. If either surface is not flat, or if one surface does not contact the other in a substantially parallel (flat surface to flat surface) manner, ineffective or inefficient valve operation may result.

The erosive and/or damaging effects of drilling fluid flow through a valve can damage the seating surfaces so that the ideal flat-surface-to-flat surface seating is not achieved. Also, the drilling fluid can damage a guide (e.g. ribs and a channel for receiving a stem or rod projecting from a valve member) or guide fingers so that the ideal surface seating is not achieved. In some instances, damage to a guide or to guide fingers results in a flat valve member surface contacting a flat seating surface at an angle so that effective valve closure is not possible or so that the valve is insufficiently closed for efficient operation. In some aspects, erosive drilling fluid flow renders initially-flat seating surfaces non-flat with resulting ineffective sealing and valve closure.

For these reasons in many mud pump systems, suction and discharge valves are repaired or replaced on a regular basis.

In many known mud pump valves, the valves are opened and closed by mechanically creating a vacuum or fluid pressure increase in the valve that overcomes a spring to allow a valve member to move. The movement of the valve member is not controlled, i.e., it is subject to a surge of fluid under pressure. As fluid pressure builds up to move a valve member, a corresponding amount of fluid builds up adjacent the valve. When the pressure is high enough, a relatively large charge of fluid goes through the valve at high velocity. This surge of fluid can have deleterious effects on valve parts, for example, such as the banging of the sealing surfaces together as a result of fluid rushing in because of a delay in the timing of the opening of the valve.

The present disclosure is directed to various methods and devices that may avoid, or at least reduce, the effects of one or more of the problems identified above.

BRIEF SUMMARY OF THE DISCLOSURE

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one illustrative embodiment, the present disclosure is related to, in certain aspects, a drilling fluid pumping system and valve, also known as a mud pump system, for pumping drilling fluid or mud used in wellbore operations. In one illustrative example, the present disclosure is related to a poppet valve wherein, among other things, the poppet has a non-rigid connection that thereby facilitates sealing with a corresponding valve seat. More specifically, in one illustrative example of the valve disclosed herein, the valve includes a valve body with a valve seat and a valve member adapted to sealingly engage the valve seat. The valve also includes an actuator operatively coupled to the valve member via a non-rigid connector, wherein the actuator is adapted for selectively moving the valve member relative to the valve seat.

BRIEF DESCRIPTION OF THE SEVERAL VIEWS OF THE DRAWINGS

The disclosure may be understood by reference to the following description taken in conjunction with the accompanying drawings, in which like reference numerals identify like elements, and in which:

FIG. 9A is a side view, partially cutaway, of a system according to one illustrative embodiment of the present disclosure.

FIG. 9B is a side view, partially cutaway, of a system according to the illustrative embodiment shown in FIG. 9A with an open valve.

FIG. 9C is a side cross-section view of a poppet of the system of FIG. 9A.

Figures 1, 1A:
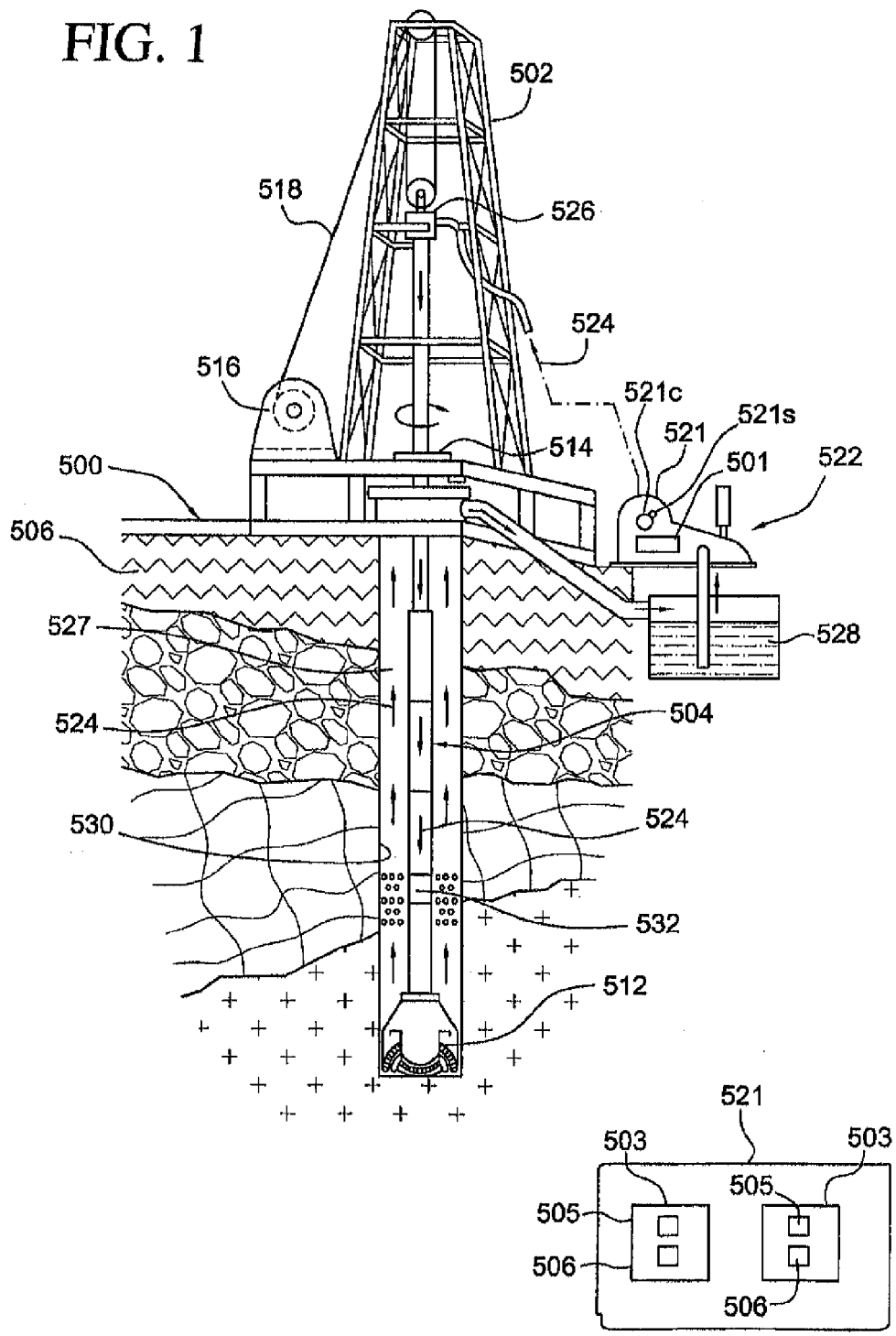
FIG. 1 is a schematic view, partially cutaway, of a system according to one illustrative embodiment of the present disclosure.
FIG. 1A is a schematic view of a mud pump system according to one illustrative embodiment of the present disclosure.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE DISCLOSURE

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The system 500 shown in FIG. 1 includes a derrick 502 from which extends a drillstring 504 into the earth 506. The drillstring 504, as is well known, can include drill pipes and drill collars. A drill bit 512 is at the end of the drillstring. A rotary system 514, top drive system 526, and/or a downhole motor 532 ("fluid motor", "mud motor") may be used to rotate the drillstring 504 and the drill bit 512. A typical drawworks 516 has a cable or rope apparatus 518 for supporting items in the derrick 502. A mud pump system 522 according to the present disclosure with one, two, three-to-ten, or more mud pumps 521 according to the present disclosure each with pumping modules with one, two or more valves per module according to the present disclosure supplies drilling fluid 524 to the drillstring 504. Drilling forms a wellbore 530 extending down into the earth 506. Each mud pump 521 has at least one valve 501 according to the present disclosure or (as shown in FIG. 1A schematically) multiple pumping modules 503 each with a suction valve 505 according to the present disclosure and a discharge valve 506 according to the present disclosure. Each mud pump 521 has a main crank shaft 521c or axial camshaft or other equivalent mechanisms that would impart a translational motion to a piston.

During drilling, the drilling fluid 524 is pumped by pump(s) 521 of the mud pump system 522 into the drillstring 504 (thereby operating a downhole motor 532 if such an optional motor is used). Drilling fluid 524 flows to the drill bit 512, and then flows into the wellbore 530 through passages in the drill bit 512. Circulation of the drilling fluid 524 transports earth and/or rock cuttings, debris, etc. from the bottom of the wellbore 530 to the surface through an annulus 527 between a well wall of the wellbore 530 and the drillstring 504. Cuttings and debris are removed from the drilling fluid 524 with equipment and apparatuses not shown, and it is re-circulated from a mud pit or container 528 by the pump(s) of the mud pump system 522 back to the drillstring 506. Also, some desirable solids may be added to the drilling fluid.

Figure 2A:
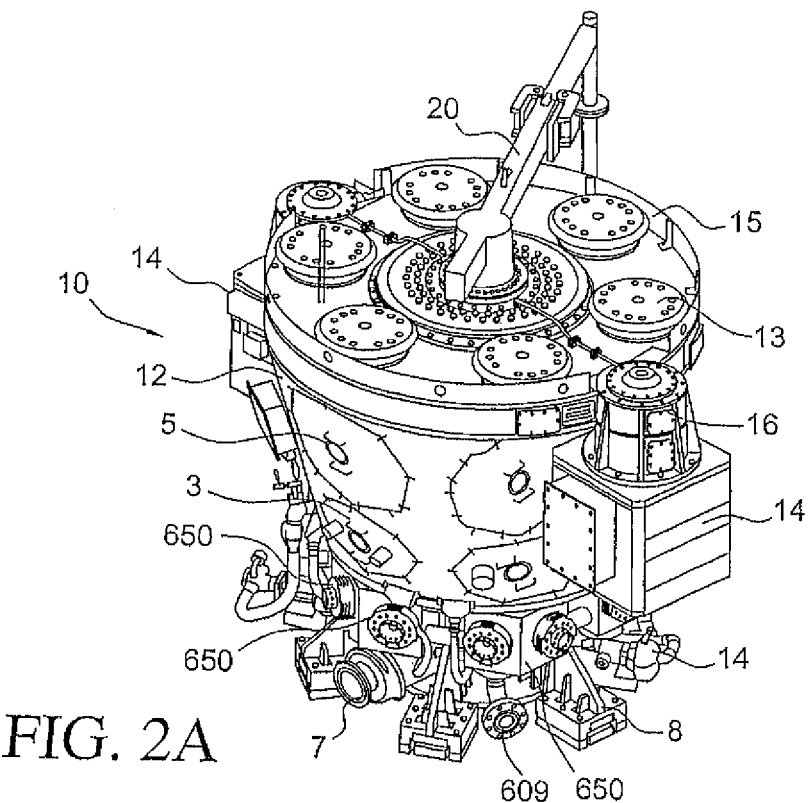
FIG. 2A is a perspective view of a pump apparatus according to one illustrative embodiment of the present disclosure.
Figure 2B:
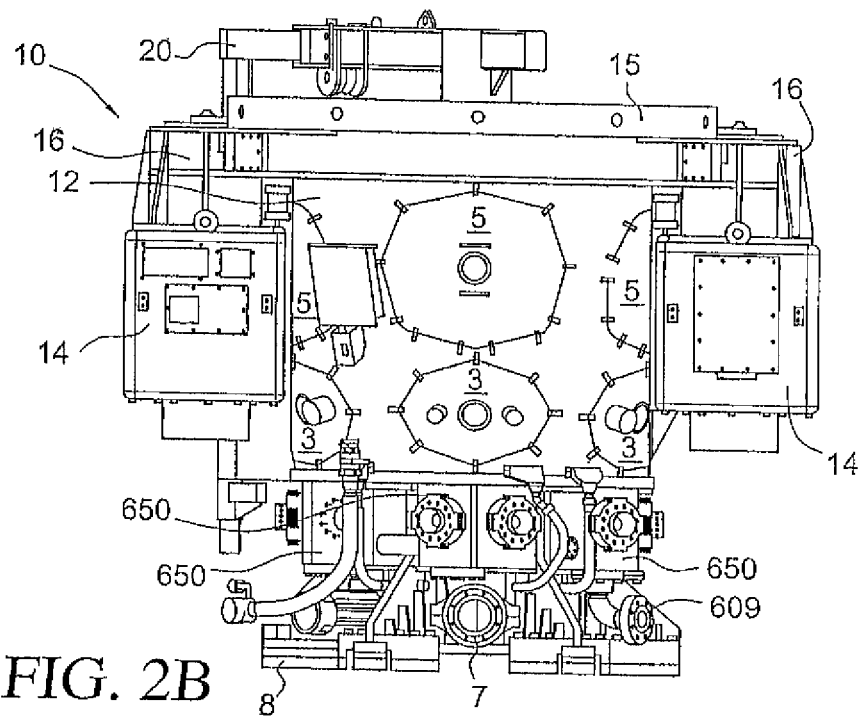
FIG. 2B is a side view of a pump apparatus of FIG. 2A.

A system 10 according to one illustrative embodiment of the present disclosure as shown in FIGS. 2A and 2B has a main housing 12 mounted on a base 8 with an optional crane system 20 for lifting and moving system parts. Drilling fluid enters the system 10 through an inlet 7 and is pumped out via the modules 650 to a main outlet 609.

Figure 2C:
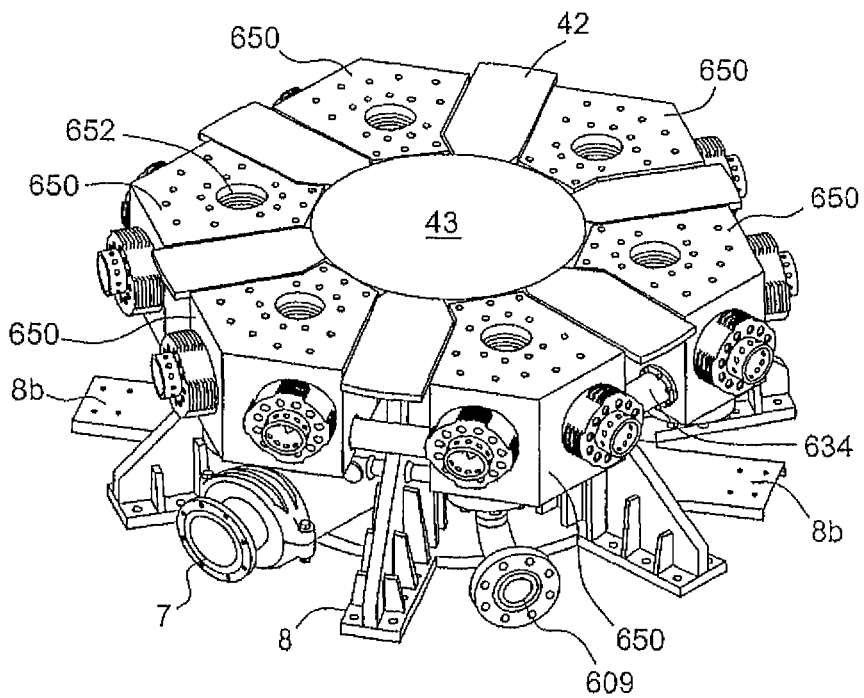
FIG. 2C is a perspective view of part of the apparatus of FIG. 2A.
Figure 2D:
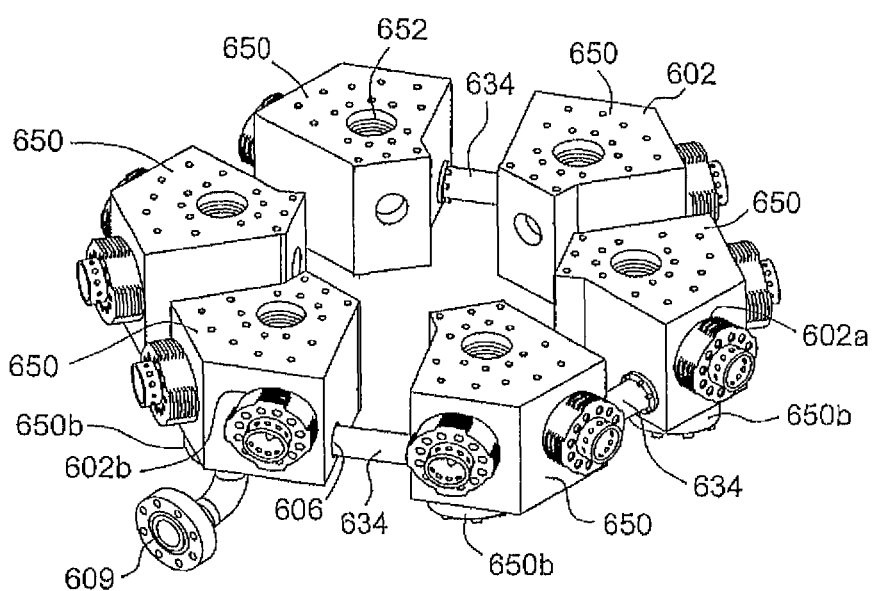
FIG. 2D is a perspective view of part of the apparatus of FIG. 2C.
Figure 2E:
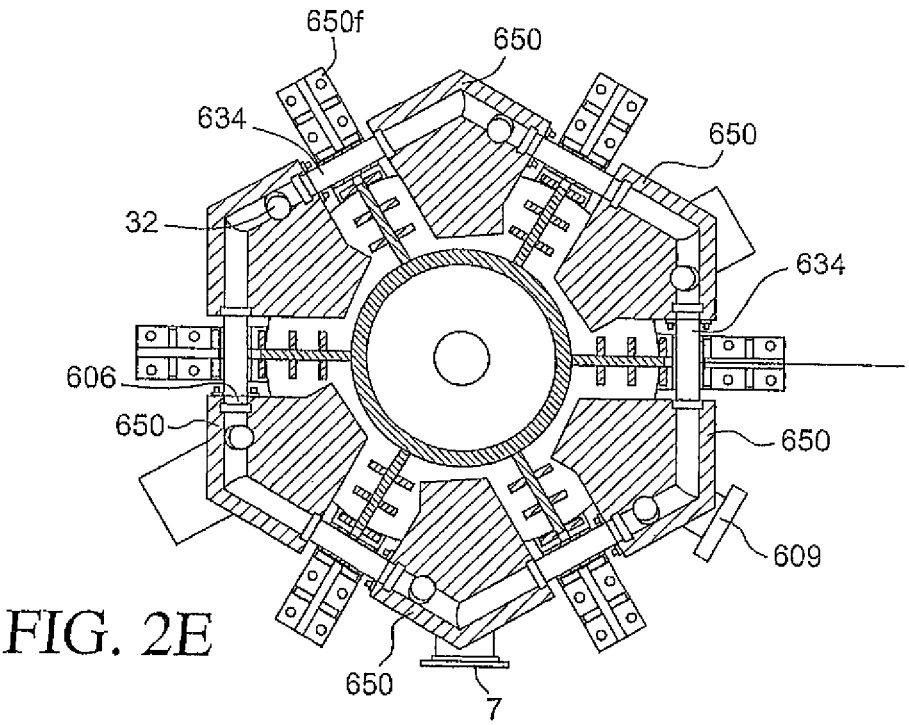
FIG. 2E is a top cross-section view of the part of the apparatus of FIG. 2C.

The modules 650 have a body 602 with a first bore 602a and a second bore 602b. In one illustrative example, a discharge valve assembly according to the present disclosure is in the first bore 602a and a suction valve assembly according to the present disclosure is in the second bore 602b. As shown in FIGS. 2C-2e, using a piston fluid is pumped into a chamber 652 of the module 650 via an inlet port 604 and is discharged from the module 650 into a discharge conduit (not shown) via an outlet port 609.

Figure 2F:
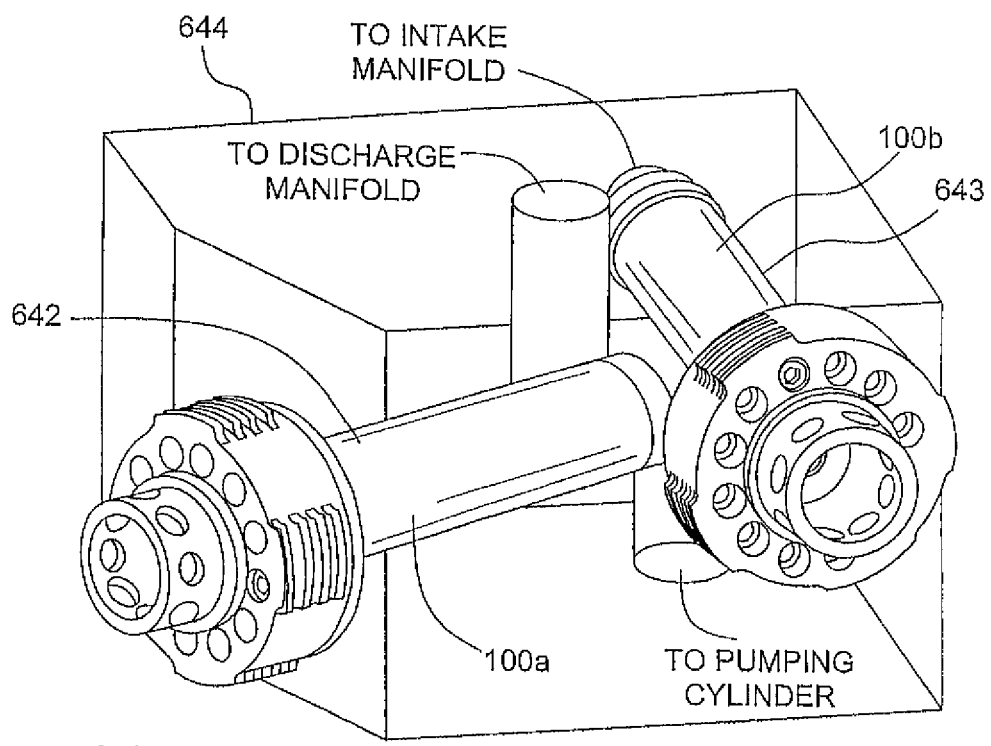
FIG. 2F is a perspective view, partially cutaway, of a pump module with valve assemblies according to one illustrative embodiment of the present disclosure.

FIG. 2F shows one illustrative example of the relative positions of two valve assemblies 100a, 100b (like the illustrative valve assembly 100) according to the present disclosure as they are present in a block of a mud pump module. The valve assemblies 100a, 100b (which may be any valve assemblies disclosed herein) are in bores 642, 643, respectively, in a block 644. The block 644 can be used in a system like that of FIG. 2A.

Figure 2G:
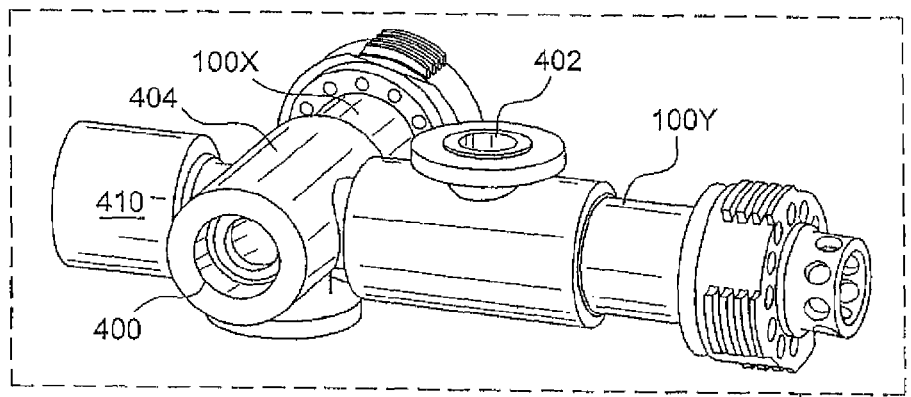
FIG. 2G is a perspective view of two valve assemblies according to one illustrative embodiment of the present disclosure.
Figure 2H:
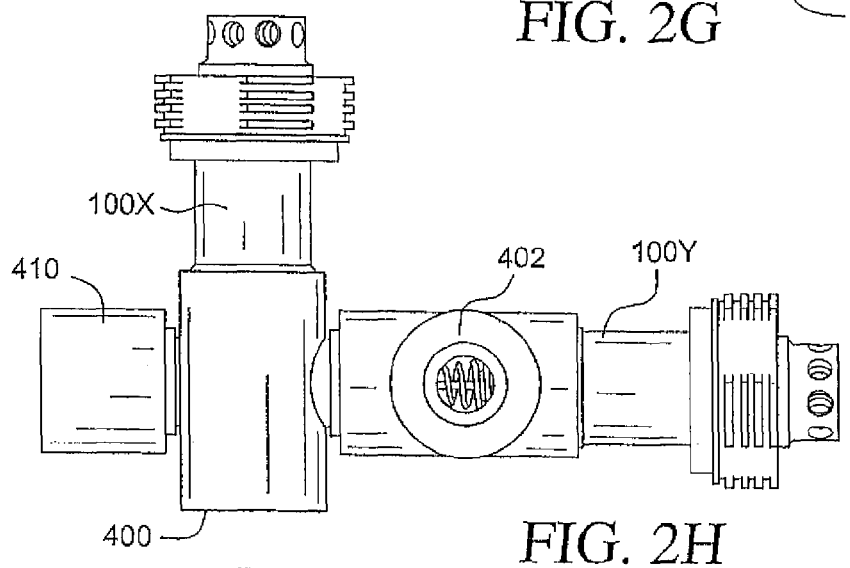
FIG. 2H is a side view of the valve assemblies of FIG. 2G.
Figure 2I:
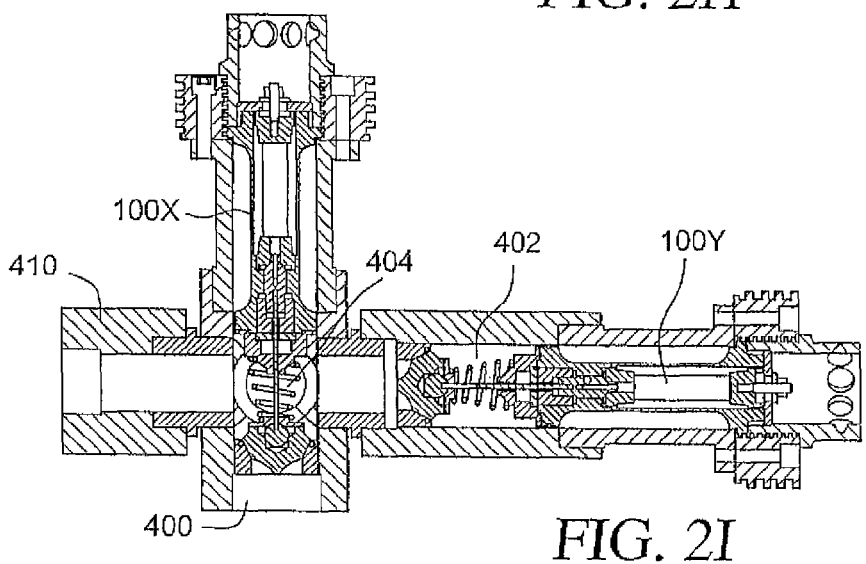
FIG. 2I is a cross-section view of the valve assemblies of FIG. 2G.

FIGS. 2G-2I show two illustrative valve assemblies 100x, 100y (like the valve assembly 100a, FIG. 9A) as they are disposed in a block (not shown) of a mud pump system. Fluid is sucked in by action of the suction valve assemblies 100x through a suction inlet 400 and discharged by action of the discharge valve assembly 100y through a discharge outlet 402. The fluid is received in a pumping chamber 404.

Fluid pumped from the chamber 404 can impact parts of the discharge valve 100x. Optionally, an accumulator/dampener 410 is in fluid communication with the pumping chamber 404. The accumulator/dampener 410 reduces undesirable pulsations of fluid under pressure from the pumping chamber 404. Any suitable known accumulator/dampener may be used.

Figure 3A:
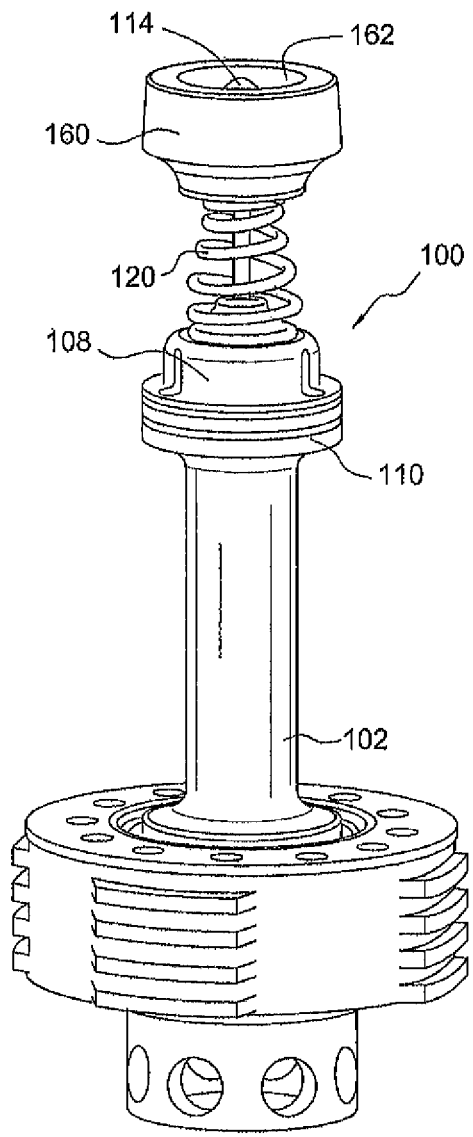
FIG. 3A is a perspective view of a valve assembly according to the present disclosure.
Figure 3B:
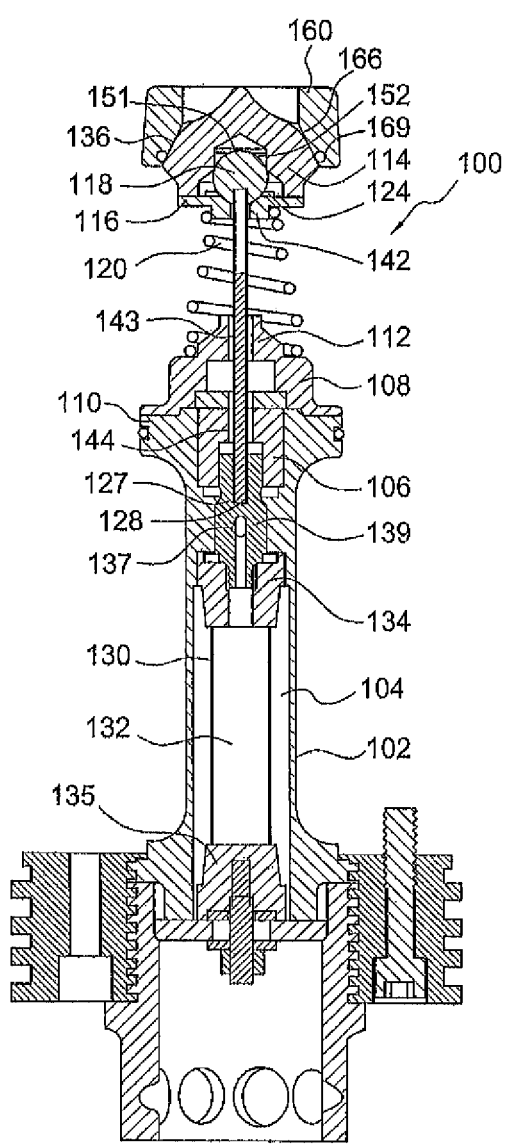
FIG. 3B is a cross-section view of the valve assembly of FIG. 3A.
Figure 4:
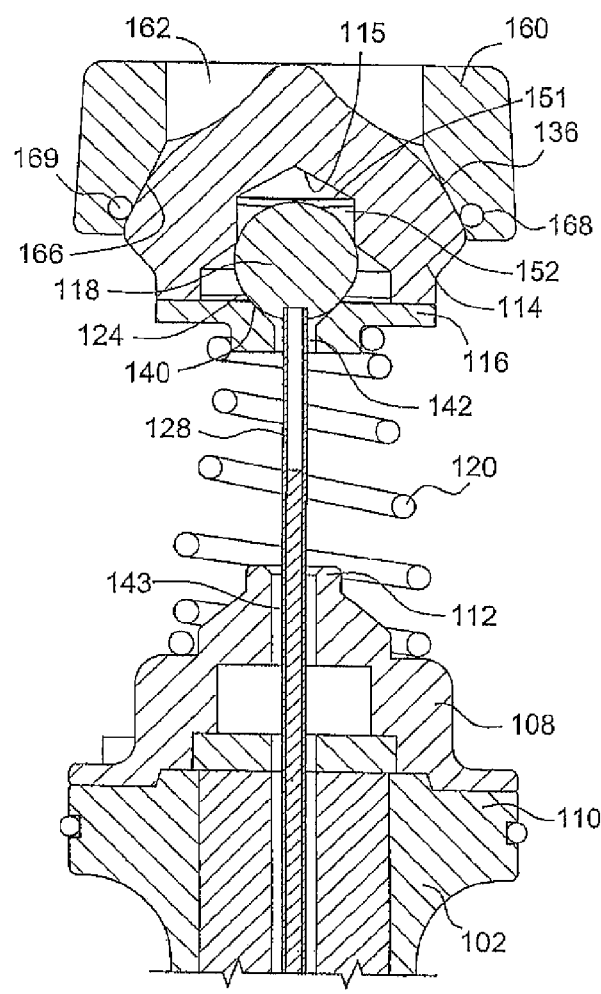
FIG. 4 is a side perspective view, partially cutaway, of part of the valve assembly of FIG. 3A.

FIGS. 3A and 3B show an illustrative embodiment of a valve assembly 100 according to the present disclosure which can serve as a suction valve or a discharge valve for a mud pump system (e.g., but not limited to, the suction valve assembly 602b and the discharge valve assembly 602a described above; or the suction valve 100x and the discharge valve 100y described above). FIG. 4 shows top portions of one illustrative embodiment of the valve assembly 100.

The valve assembly 100 has a hollow cartridge stem 102 with an interior channel 104 within which are located a valve actuator 130 and an adapter 106. A spring support 108 is connected to a flange 110 of the cartridge stem 102 that has an end 112 which is encompassed by part of an expansion spring 120 an end of which abuts the spring support 108. In one illustrative embodiment, the spring support 108 may be coupled to the flange 110 by a threaded connection and/or by a plurality of bolted connections (not shown for purposes of clarity).

A poppet (or curved valve member) 114 rests on a support 116. The poppet 114 is coupled to the support 116. In one illustrative embodiment, the poppet 114 is coupled to the support 116 (around the perimeter thereof) with a plurality of fasteners (not shown for clarity), e.g., screws and/or bolts. An end 122 of the spring 120 abuts and is biased against a bottom of the support 116. A ball 118 rests on a ball support 124 which rest on the support 116. In one illustrative embodiment, the ball support 124 may be a Belleville washer. A non-rigid connector 128 (e.g., a cable, a wire, etc.) (made of any known material) is connected to the ball 118. In one illustrative embodiment, the non-rigid connector 128 passes through a hole 140 in and through the support 124, through a hole 142 in the support 116, through the spring 120, through a hole 143 in the spring support 108, and through a hole 144 in the adapter 106 which is threadingly connected to an illustrative coupling 139 of an actuator 130 (see FIG. 5).

An illustrative Belleville washer 151 above the ball 118 abuts an underside 115 of the poppet 114. A recess 152 within the poppet 114 houses the ball 118, the washer 151 and the support 124. The poppet 114 has a curved surface 136 for sealingly abutting a curved surface 166 of a valve seat 160 and, in some embodiments, a seal 169 positioned in the valve seat 160 as described below. When the support 116 is coupled to the poppet 114, the ball support 124 and the washer 151 are secured in position. This arrangement of the non-rigid connector 128, the ball 118, and the two illustrative Belleville washers permits the poppet 114 to move laterally (from side to side in the drawing views) and to pivot or oscillate relative to the ball 118. This movement facilitates sealing even when the poppet 114 is not precisely aligned with the valve seat 160. The combination of the two illustrative Belleville washers and the ball 118 are thus means for operatively coupling the poppet 114 to the non-rigid connector 128 such that the poppet 114 has freedom of movement to facilitate sealing between the valve seat 160 and the poppet 114.

The poppet 114 is movable toward and away from a valve seat 160. The valve seat 160 has a channel 162 for fluid flow therethrough (see FIGS. 4 and 9b). The poppet 114 selectively closes off and opens up the channel 162 to fluid flow. Part of the channel 162 is sized and configured for the poppet 114. The curved surface 166 of the valve seat 160 is positioned to seal against the curved surface 136 of the poppet 114. In one illustrative embodiment, there are no guide fingers projecting from the poppet 114 (although they may be employed if desired), and there are no arms or ribs across the valve seat 160. Thus, the valve seat 160 is essentially unobstructed for receiving and stabilizing a rod, stem or neck projecting from the poppet 114. However, in the illustrative example depicted herein, there is no such rod, neck or stem projecting from the poppet 114. Thus, flow through the channel 162 is unobstructed by such parts which are present in many prior valves.

In one illustrative embodiment, a recess 168 is formed in the valve seat 160 holds a seal 169. Part of the curved surface 136 of the poppet 114 sealingly abuts the seal 169 when the valve assembly is closed, preventing fluid flow. Thus, in one illustrative embodiment, the engagement between the curved surface 136 and the seal 169, in conjunction with the seal established between the curved surfaces 136, 166, provides for a dual sealing arrangement.

The poppet 114 has a range of freedom of movement within the channel 162 of the valve seat 160. The relative freedom of movement of the poppet 114 disclosed herein, as compared to prior art poppet valves, is desirable because it permits or enables the poppet 114 to effectively seal with the valve seat 160 even under less than ideal conditions, e.g., where there is axially offset misalignment—the longitudinal axis of each of the valve seat and the poppet are not parallel or are positioned at an angle relative to one another—between the poppet 114 and the valve seat 160 as the sealing relationship is being established. This increased freedom of movement of the ball 118 in the illustrative poppet 114 disclosed herein, is provided for, in whole or part, by various structures disclosed herein and by the relative arrangement of those structures. For example, in the presently disclosed example, the ball 118 is coupled to the non-rigid connector 128, e.g., a cable. When the poppet 114 is disengaged from the valve seat 160, the non-rigid connector 128 permits the poppet 114 to move or pivot (on the ball 118) in contrast to prior art poppet valves where the poppet is rigidly coupled to a rod or other similar rigid structure. In the example depicted herein, the poppet 114 is able to pivot or rotate (to some degree) by virtue of the engagement of the ball 118 with the washer 124 and/or the washer 151. It should be noted that the spring 120 is sized and configured such that the non-rigid connector is always in tension. Even though the non-rigid connector 128 is in tension, the poppet 114 is still able to move (relative to prior art valves with rigid connection members) to thereby facilitate sealing.

As noted earlier, the poppet 114 is located within and with respect to the valve seat 160, and part of the outer curved surface 136 of the poppet 114 will sealingly abut the seal 169 and the curved surface 136 will sealingly abut the curved surface 166. The poppet 114 can be aligned (or not) with the valve seat 160, but either way an effective seal is maintained with part of the surface 136 sealed against the seal 169. Movement of the poppet 114 on the ball 118 and the sizing and configuration of the various parts contribute to permissible freedom of movement of the poppet 114 without sacrificing the sealing necessary to close the valve assembly.

Figure 4C:
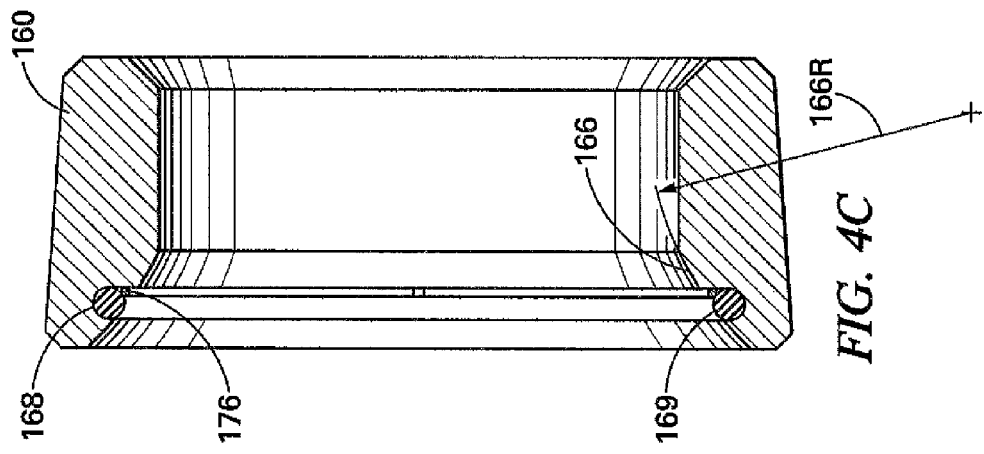
FIG. 4C depicts one illustrative example of a valve disclosed herein wherein a snap-ring is employed to retain a seal used in the valve.
Figure 4A:
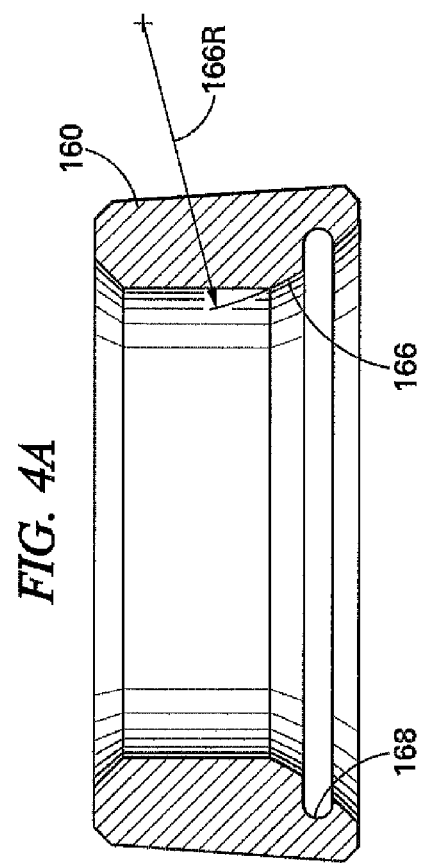
FIG. 4A is a cross-sectional view of one illustrative embodiment of a valve seat with an illustrative curved valve seat as described herein.

FIG. 4A depicts one illustrative embodiment of a valve seat 160 with curved surfaces 166 as disclosed herein. As shown therein, the curved surface 166 of the valve seat 160 has a radius of curvature 166R. The magnitude of the radius of curvature 166R may vary depending upon the particular application, the size of the valve and the size and configuration of the poppet 114. In one illustrative embodiment, for an illustrative 4.7 inch valve, the radius 166R may be approximately 2.5 inches.

Figure 4B:
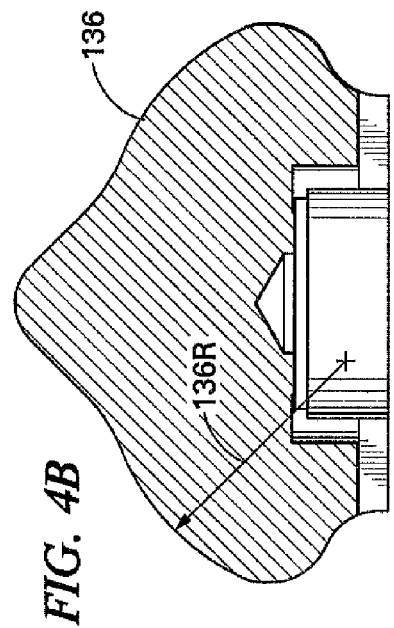
FIG. 4B is a cross-sectional view of one illustrative embodiment of a poppet valve disclosed herein.

FIG. 4B is a cross-sectional view depicting one illustrative embodiment an illustrative poppet 114 disclosed herein. As shown therein, the curved surface 136 has a radius of curvature 136R. The magnitude of the radius of curvature 136 may vary depending on the particular application, as well as the size and configuration of the poppet 114. In one illustrative embodiment, the radius 136R may be approximately 2 inches.

Relative to the centerline of the valve, the curve surface 166 is an outwardly curved convex surface, while the curved surface 136 of the poppet 114 is an inwardly curved concave surface. Stated another way, in the illustrative embodiments disclosed herein, the curved surface 166 and the curved surface 136 are opposed curved surfaces that, when engaged, can, at least initially, form a line of contact around the exterior of the poppet 114.

FIG. 4c depicts one illustrative embodiment of the valve seat 160 have the illustrative seal 169 positioned in the seal recess 168. Additionally, as shown in FIG. 4C, an illustrative snap-ring 176 may be positioned adjacent the seal 169 to secure the seal 169 in the recess 168. The size, shape and configuration of the snap-ring 176 may vary depending on the particular application.

Figure 5:
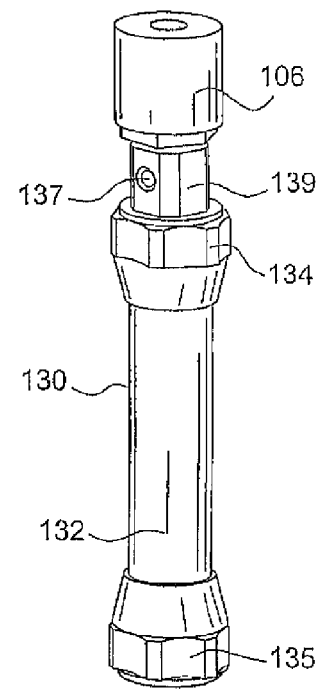
FIG. 5 is a perspective view of an actuator of a valve assembly as in FIG. 3A.

FIG. 5 shows the valve actuator 130 which can be, in certain aspects, any suitable known controllable, valve actuator, e.g., but not limited to "muscle" apparatuses, pneumatic cylinder actuators, hydraulic cylinder actuators, and electromagnetic actuators.

In one aspect, as shown in FIG. 5, the valve actuator 130 is a controlled, pneumatically powered actuator known as a FESTO (TRADEMARK) "muscle" actuator. In this illustrative example, the actuator 130 has an expandable hose 132 mounted between two bases 134, 135. Air under pressure is introducible into the interior of the hose 132 through a channel 137 in a pneumatic coupling 139. The upper base 134 is connected to a pneumatic coupling 139 to which the adapter 106 is secured.

As shown in FIG. 5, and in connection with FIGS. 3A, 3B, 8A and 8B, air under pressure has not yet been applied within the hose 132. In the illustrative example where the base 135 is fixed, once air is applied the hose 132 expands outwardly, effectively pulling the top base 134, and thus the adapter 106, toward the lower base 135. These actions correspondingly exert a pulling force on the non-rigid connector 128 which causes the poppet 114 to disengage from its sealing contact with the valve seat 160. During this process, the spring 120 acts to resist all of these pulling forces that cause the poppet 114 to disengage.

Figure 6:
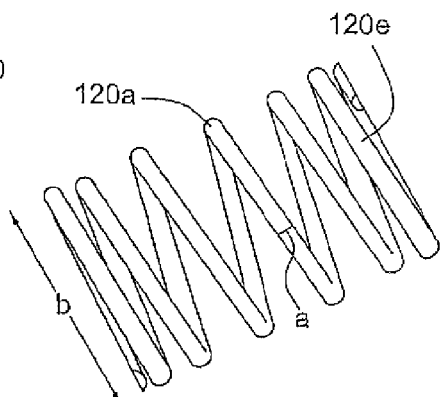
FIG. 6 is a side view of a spring according to one illustrative embodiment of the present disclosure.

FIG. 6 shows one illustrative embodiment, spring 120a, of a spring 120 that may be employed with the valve described herein. As compared to prior known spring designs, the spring 120a has a spring body with a smaller spring diameter, "b", and with a higher spring force; but the wire diameter, "a", is relatively large, e.g. 0.22 inches, which results in a higher spring force. Use of an actuator like the actuator 130, FIG. 5, makes it possible to use a spring with the increased spring force (with the increased wire diameter). The overall diameter, b, of the spring 120a is relatively smaller than prior springs because the spring 120a does not have to accommodate the relatively large necks of certain prior valve members. For example, in one illustrative embodiment, for an illustrative 7 inch poppet valve, the spring 120 may have a wire diameter ("a") of about 0.262 inches, a spring constant of about 55 lbs/in, an overall diameter of about 3.4 inches, an overall length (relaxed) of about 5.43 inches, and an installed length of about 4.3 inches.

Certain prior mud pump valve springs reached a known resonant frequency (e.g. about 40 Hz to 43 Hz) creating poppet oscillations that resulted in an improperly seated poppet and in fluid pulsations transmitted downstream of a valve assembly. Due to its size and weight, the spring 120a has a higher natural frequency than those prior springs which resonate around 40 Hz and, thus, more force is required to resonate the spring 120a. In certain aspects the spring 120 (or 120a; or the spring 120b, FIG. 7A) is sized and configured so its natural resonant frequency is about 25% higher than that of certain known springs (e.g., in one aspect 50 Hz vs 43 Hz). This reduces the chance of flow-induced resonance in the valve assembly with such a spring; provides better, more stable control of the valve assembly's poppet; and provides more positive seating of the poppet against the valve seat.

Figures 7A, 7B:
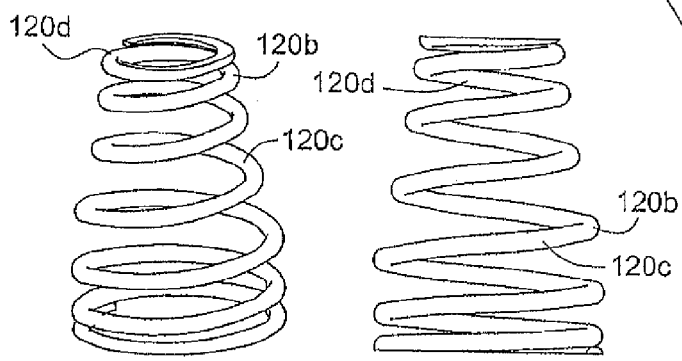
FIG. 7A is a perspective view of a spring according to one illustrative embodiment of the present disclosure.
FIG. 7B is another perspective view of the spring of FIG. 7A.

FIGS. 7A and 7B show an illustrative spring 120b according to one example of the present disclosure which has a spring body 120c and an end tapered portion 120d which abuts a support (e.g. like the support 116, FIG. 3A). The tapered portion 120d, since it is narrower than a base 120e of the spring 120b, contributes to the freedom of movement of the poppet 114 (e.g. as in FIG. 8A). The following table reflects some data for one illustrative embodiment of a spring 120a as disclosed in FIGS. 7A-7B (dimensions in inches) having an illustrative wire diameter of 0.25 inches:

| Coil Rev. | 0-1.5 | 1.5-4.5 | 4.5-5.5 | 5.5-7.0 | 7.0-9.0 | 9.0(-10) | 10 |
|---|---|---|---|---|---|---|---|
| Starting Pitch | 3.0 | 3.0 | 2.875 | 2.75 | 2.25 | 1.688 | 1.688 |
| Ending Pitch | 3.0 | 2.875 | 2.75 | 2.25 | 1.688 | 1.688 | |
| Pitch | .188 | .388 | .750. | .750 | .500 | .266 | .250 |
| Length | .432 | 1.706 | .754 | .933 | .766 | .278 | |
| Overall Length | .432 | 2.139 | 2.893 | 3.826 | 4.592 | 4.87 | |

Figure 8A:
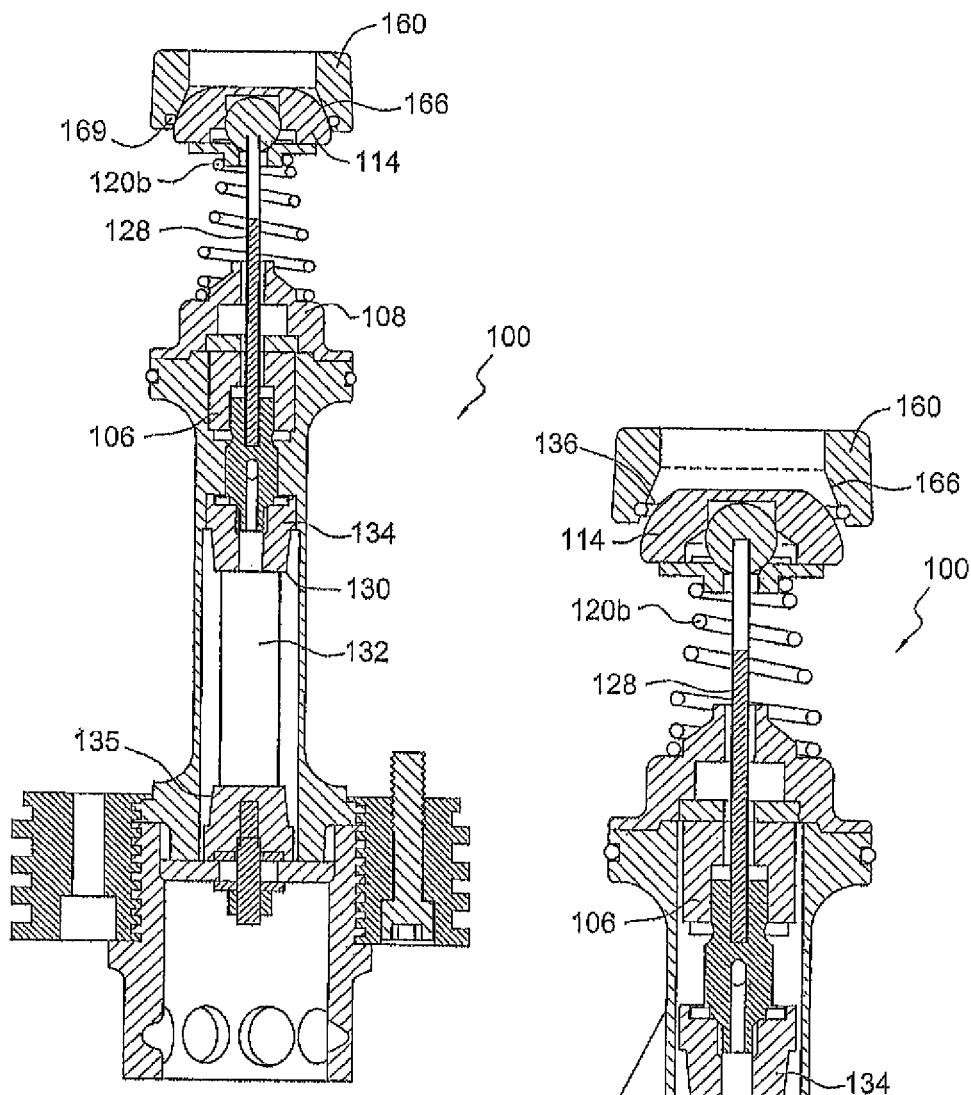
FIG. 8A is a side view, partially cutaway, showing a step in the operation of a valve according to one illustrative embodiment disclosure of the system of FIG. 7A.
Figure 8B:
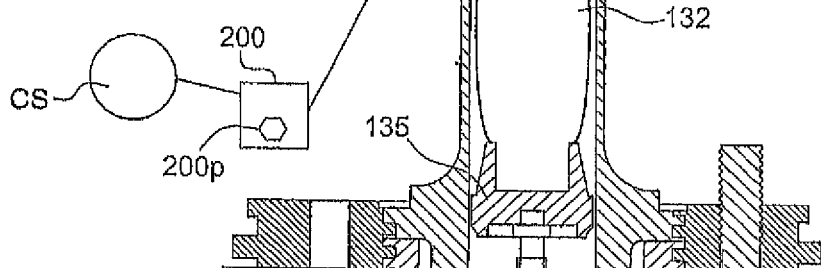
FIG. 8B is a side view, partially cutaway, showing a step in the operation of the valve of FIG. 8A showing a step following the step of FIG. 8A.

FIGS. 8A and 8B illustrate steps in the operation of a valve assembly 100 (which has an illustrative tapered spring 120b, although any suitable spring may be used). The operation of the valve will depend upon whether the valve is used as a suction valve or a discharge valve in the illustrative pumping modules described herein. As shown in FIG. 8A, air under pressure has not yet been applied within the hose 132 and the spring 120b urges the poppet 114 into sealing contact with the seal 169 and with the valve seat 160. In the position shown in FIG. 8A, the valve assembly 100 is closed to fluid flow therethrough.

During operation, when the valve is positioned as a suction valve, fluid pressure from the pumping chamber forces the poppet 114 against the valve seat 160, while incoming fluid (that will flow into the pumping chamber) tends to act to open the suction valve. This opening force on the suction valve is resisted by the spring and pressure from the fluid in the pumping chamber below the poppet 114. Conversely, the opposite is true when the valve is positioned as a poppet valve. In that case, pressure within the pumping chamber tends to open the discharge valve while the spring and the fluid pressure from the discharge manifold that interconnects all of the pumping modules tends to close the discharge valve. To explain the operation of the valves disclosed herein, it will be assumed the pumping chamber is full of liquid and both the suction valve and the discharge valve are closed. As pressure in the pumping chamber increases, the discharge valve will eventually open and fluid from the pumping chamber will flow through the discharge valve to the discharge manifold. When the discharge stroke of the pump is completed, and the piston motion is reversed, fluid pressure in the pumping chamber decreases and the discharge valve eventually closes. As the pressure in the pumping chamber decreases, the fluid pressure beneath the suction valve decreases to a value such that the suction valve opens and fluid from the suction manifold enters the pumping chamber. At this point the process repeats. In some cases, when the piston just begins its reverse travel, both the discharge valve and the suction valve may be slightly open simultaneously.

When the "muscle" of the actuator 130 is not expanded, i.e., when the actuator 130 is not energized, there is residual air trapped between the commanding valve and the actuator 130. The pressure of this trapped air is close to the pressure that existed in this line at the moment of exhausting the air and closing off the valve's exhaust port. When the actuator 130 is actuated, i.e., when the hose 132 expands, there is air at a pressure that is sufficient to open the valve, e.g. 110 psi. The actuator 130 and air lines are filled in order to decrease the actuator's response time—the time to respond to a commanding pressure. If the actuator 130 is completely empty or, with, e.g. air at atmospheric pressure, it will take slightly longer for the actuator 130 to respond, because when such a high pressure is applied the cavity would have to be filled with air first, then compress the air just introduced to a high enough pressure to barely stretch or expand the hose 132 and only after that will the hose 132 change its length or respond to a commanding pressure.

As shown in FIG. 8B, air under pressure from an air supply 200 (with a proportional control valve 200p) has been applied within the hose 132 causing it to expand and pulling the non-rigid connector 128 away from the valve seat 160. In so doing, the poppet 114 is moved out of sealing contact with the valve seat 160 and the seal 169 of the valve seat 160 and the valve assembly is opened to fluid flow permitting fluid to flow into and out from a mud pump module housing the valve assembly.

In one illustrative example, the poppet 14 is part of the valve cartridge 110a. With reference to FIG. 9A, in one illustrative embodiment, the valve cartridge 100a may comprise a single unit that includes a mounting flange 101a, a cartridge body 101b, the actuator 106, the spring 120b, the non-rigid connector 128, the poppet 114 and the ball 118, and associated structure. During assembly, when the pump is assembled for the first time, it is much easier to have a preassembled valve cartridge 110a and, without adjustments, to insert and bolt it in and have it immediately become functional. Moreover, in servicing the valve, it is much easier to extract the entire cartridge 100a, versus bits, individual parts, and/or pieces. In certain current designs, a poppet/valve has a pseudo cartridge design in the sense that the valve has no restricting elements to keep it attached to the cartridge. In other words, the cartridge in prior art devices can be loosely put together prior to assembly and it can be inserted as a cartridge being secured to the body by bolts. However, if during this assembly process, or later on during servicing the valve, this cartridge is turned upside down, the valve itself can become loose and fall to the ground.

Often in such prior systems there is no element like a snap ring to secure the valve to the cartridge 100a. In one embodiment, the seal 169 is part of the valve housing. It is easier to have the valve seat 160 be part of a block that can be preassembled to the pump and, later on, during a later step in manufacturing, to bolt on to it a subassembly like the valve cartridge 100a.

In designs according to the present disclosure, seals, e.g. the seal 169, do not resonate. According to the present disclosure, such seals are surrounded by a support and have no extraneous or "banging" features which could be excited by a surrounding flow stream.

In certain aspects according to the present disclosure, poppets 114 and seats 160 are made, at least partially, of ceramics which do not rust. In certain particular aspects, an alumina based ceramic offers very high strength and good wear resistance. In other aspects, a boron carbide ceramic can be used which has excellent erosion wear resistance. Both of these two ceramics have a higher erosion resistance then steel. In certain aspects the poppets 114 of assemblies according to the present disclosure are made with a steel core surrounded by a ceramic. The steel core supports the Belleville washers and can have cut threads into it. A ceramic outer skin provides erosion resistance. In certain aspects, the special profiles facilitate the flow opening and closing the valve gradually.

In certain prior art designs, poppet valves have two parallel sealing surfaces. Often these surfaces form a seal that is part of conical bodies; i.e. the seal has a conical machined surface against which is pushed a poppet. The poppet's sealing surface is also conical so that, at every instance, the seat's and poppet's sealing surfaces are parallel. During discharge, when the two bodies are separating and, thus, allowing the fluid to flow from the pumping chamber into the discharge manifold, the fluid is squeezed in between these flat surfaces. During this phase the fluid's velocity can be greatly increased as it passes from a large cross sectional flow area of the pumping chamber outlet into a smaller cross-sectional flow area substantially defined by the parallel sealing surfaces of the valve's passage way. Moreover, because there is no controlling actuator, such a prior art valve can open suddenly when the fluid's pressure exerts onto the face of the poppet a force slightly higher than that developed by the spring acting on the opposite face of the poppet. As the fluid leaves the flow area defined by the parallel sealing surfaces at high velocity, it enters into a larger cross sectional flow area that is the discharge manifold. The high velocity and energy fluid acts almost like a piston in this case and pushes an adjacent block of fluid along the discharge line. This sudden move of a significant block of fluid can create a "bang" or a specifically loud noise almost like a pounding. This repeated banging/pounding can have detrimental effects on the drill line or other equipment.

As noted earlier, in certain valve assemblies according to the present disclosure, the flat parallel sealing surfaces are replaced by curved sealing surfaces 136, 166. Additionally, there is a controlling actuator 130 that can open the valve before pressure in the pumping chamber reaches a value high enough to counteract the spring 120 and, thus, to open the valve. Accordingly, the pressure at which the fluid leaves the pumping chamber is greatly reduced. In the presently disclosed valve, since the flow path between the poppet 114 and the valve seat 160 is at least partially defined by the two curved sealing surfaces 136, 166, the valve's passage way flow characteristics do not impart a high velocity/energy to the fluid stream exiting the valve. Consequently, the fluid enters and leaves the discharge manifold and line respectively in a more dispersed manner. There is no "bang" as in certain previous valves because the fluid does not flow in discrete "blocks".

The control system CS controls the air supply 200 and, thus, controls the valve assembly 100. This is in contrast to prior valves in which fluid flow (and associated pressures) itself opens and closes the valve by virtue of overcoming certain static forces, like a spring holding a poppet in sealing engagement with a valve seat. In one aspect, the control system controls the speed with which the parts move and thereby controls the speed of opening and of closing off the valve. Using appropriate software programming of programmable media in the control system, the control system controls an electro proportional valve control (e.g. the valve 200p, FIG. 8B) that, in turn, controls the amount of air that enters or leaves the actuator 130, and the timing when the air enters or leaves the actuator 130. Consequently, the control system 200 controls how fast, how long and how much the valve is opened. Gradual opening and closing is possible which reduces pressure pulsations and the resulting impact and banging between sealing surfaces, as is present in prior art pumps and valves. Each pump shaft (crankshaft) may have a speed sensor in communication with the control system 200 (e.g. a sensor 521s, FIG. 1). In systems with electric motors that drive the crankshaft(s), the motors are commanded through software in the control system and the same speed control signal can be broadcast to the control system. A dedicated speed sensor or a linear displacement transducer installed in every cylinder provides information for a closed loop control system (usable, e.g., to diagnose a pump in case of failure). With valve assemblies according to the present disclosure, the valves may not be connected to the crankshaft. Certain aspects of the control system and control methodology that may be employed with the valve and pumping systems disclosed herein is disclosed in U.S. application Ser. No. 12/971,757 filed on Dec. 17, 2010, entitled Pulsation Dampening System for a Reciprocating Pump, which is hereby incorporated by reference in its entirety.

The control system 200 has programmable media, e.g. in a computer, computers, and/or PLC(s). In one aspect, the control system is preloaded with a program that includes a defining equation and a curve fitter. The defining equation is a function of pump shaft speed. The curve fitter compares the curve generated by the defining equation with an "ideal" curve desired to drive the valve. The ideal curve usually represents the valve's speed, or acceleration, or opening and/or, a different relevant parameter plotted versus time. The output from the control system drives a proportional valve, a valve that controls the actuator 130, e.g., in one aspect, supply air into a FESTO (TRADEMARK) "muscle". Thus, the valve being actuated closely follows the preprogrammed curve/equation and the valve opens or closes at a certain velocity or acceleration, or that it opens at a certain rate over the duration of a pumping cycle. The opening or closing rate can be constant or variable. That is, the valve can start opening at a certain low rate followed by a higher rate followed by a different rate, and so on.

In one aspect, during a cycle the valve tends to follow a certain bell-shaped curve. Thus, the valve starts opening at a low rate followed at the very next instance by a slightly higher rate and in the next instance by an even higher rate and so on. All this is followed on the descending side of the curve by a lower rate followed by a slightly lower rate and so on until the valve closes. By introducing or expelling fluid into or from the pumping chamber at certain times the pump's behavior is changed or the pump's flow is measurable.

The mechanical equivalent of controlling a valve's opening rate is a cam. The cam, through its profile, controls how fast and in what relationship relative to another element, e.g. a crankshaft, the valve will open or close. In other words, it controls the valve's rate (displacement versus time). However, a cam's profile cannot be changed very easily because it is cut in metal. A practical method is to introduce a hydraulically actuated push rod or cam follower in between the cam and valve. Thus, the rate can change at will within a limited range. In the control strategy according to the present disclosure there is no piece of hardware/cam that limits the valve's rate. Consequently, in the proposed actuation and control strategy, the desired curve can be changed on the fly as long as the controller, e.g. a computer or PLC, can accept/support it. Programmability makes this equivalent to an infinitely variable profile cam shaft and the pump's output flow and vibration can be controlled. (An undesirable consequence of output flow in certain prior systems is component failure, e.g. due to cavitation.)

With the curved mating sealing surfaces 166, 136 of the valve seat 160 and poppet 114, any contact results in an effective seal. Pressure fluctuations generated in or by prior art valves are reduced or eliminated and valve control reduces pressure fluctuation in the discharge line during pump operation.

Systems according to the present disclosure provide a fail safe mode. If a valve assembly according to the present disclosure that is inserted fails, then, for safety reasons, the pump continues working at either reduced or normal parameters until it is safe to stop it for service. In systems according to the present disclosure, if the actuator 130 fails, e.g. if the muscle fails, it breaks or bursts, the valve will operate in an unrestricted manner (e.g. as a current known design valve). Thus, the pump can continue working at almost the same parameters until it is safe to stop it.

FIGS. 9A and 9B show a valve assembly 100a, like the valve assembly 100 (like numerals indicate like parts) with a spring 120b and a poppet 114a. The poppet 114a has a nose 114n projecting from a poppet body 114b. The nose 114n projects into the flow channel 162 of the valve seat 160. In certain aspects, in systems according to the present disclosure the surface 166 on the valve seat 160 becomes, advantageously, more elastic. In a seal, two surfaces or edges are pushed against each other by a force. This acting force can be perpendicular to or at an arbitrary angle relative to the sealing surfaces. In illustrative systems according to the present disclosure the sealing bodies are the rubber seal 169 and the poppet 114 in one instance and, the sealing surface 166 in the valve seat 160 itself and the poppet 114 in a second instance. During a valve closing cycle, the first seal occurs in between a rubber O-ring 169 and poppet 114. The acting force is axial relative to the poppet 114, but it is at an angle relative to the edge of contact between the two curved surfaces of the O-ring 169 and poppet 114, respectively. When the O-ring 169 and the poppet 114 come into contact, at the edge or area (e.g., when deformed or worn) of contact, the vector components of this acting force are a normal to curved surfaces of the two components and tangential to such curved surfaces. The tangential vector will tend to stretch the rubber O-ring 169 (the overhanging part of it) instead of purely compressing it. With the rubber O-ring 169 being surrounded/supported by the seat's rigid body, the rubber will take a very high force in compression as the normal-to-curved surfaces vector component. The rubber becomes difficult to compress when it is surrounded by a rigid wall. Thus a mechanical maze is formed and, thus, the fluid encounters a high flow resistance. There is a sequence of high pressure (inside the pumping chamber), followed by a no flow area (where the rubber O-ring contacts 169 the poppet 114), followed by a low pressure area (right after the rubber seal 169) and finally, followed by a no flow area at a contact between the surface 136 of the poppet 114 and the surface 166 of the valve seat 160. Also, the shape of the deformed rubber O-ring 169 at the leading edge toward the impinging fluid does not allow the fluid to enter in between the poppet 114 and seal 169.

Valve "shivering" occurs when a valve is not actuated (pushed or pulled onto its seat) with a high enough force, and flow induced forces fully or partially unseat or seat the valve in a rapid sequence. Thus, the valve cannot fulfill its primary function of separating two cavities. In systems according to the present disclosure, the actuator 130 working against a spring 120 reduces or eliminates valve "shivering" because two main forces are acting upon the valve's poppet 114—the force generated by a compressed spring and, in opposite direction, the force developed by the FESTO (TRADEMARK) "muscle" or an equivalent actuator 130. Secondary forces that are pulling and pushing the poppet 114 are those flow induced because of the high mainly axial forces generated by the two components, spring 120 and actuator 130, any minute force variation induced by flow is counteracted by either one of the two large forces. The spring 120 will oppose the motion if it tends to unseat the poppet. Conversely, the actuator 130 will oppose any pulling or seating of the poppet 114; and thus the poppet 114 has a very stable attitude in flow.

FIG. 9B shows the actuator 130 activated; air applied to the hose 132 has expanded the hose 132 making it contract down, thereby, unseating the poppet 114a from the valve seat 160. Of course, as will be recognized by those skilled in the art after a complete reading of the present application, the actuator 130 may also be a hydraulic actuation instead of the illustrative pneumatic actuator discussed above.

Figure 9D:
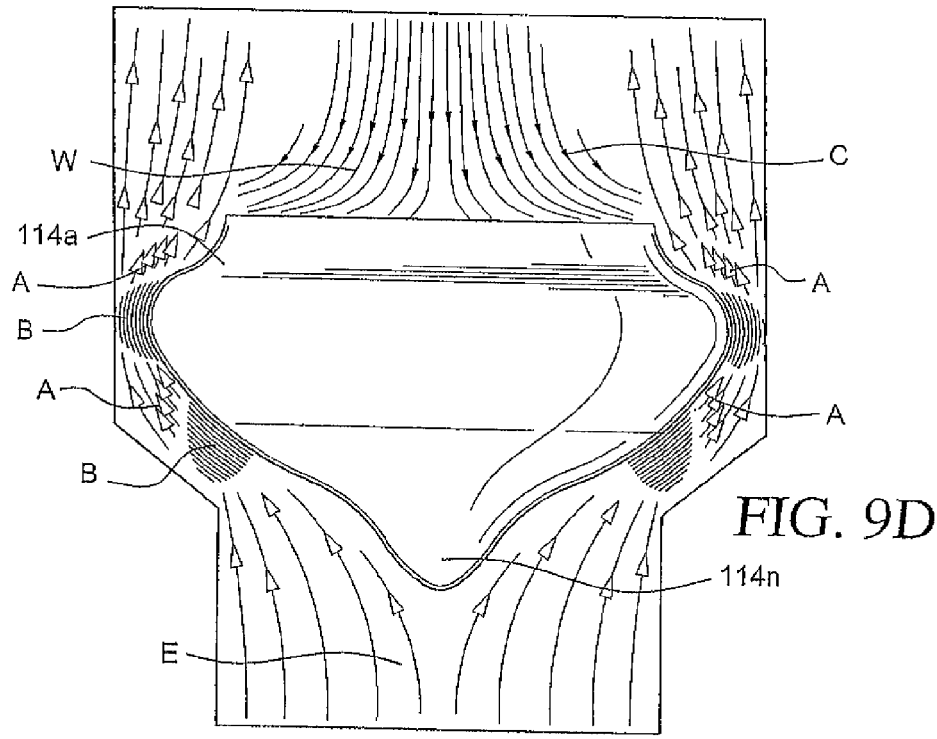
FIG. 9D is a side cross-section view of a poppet in a system according to one illustrative embodiment of the present disclosure.
Figure 9E:
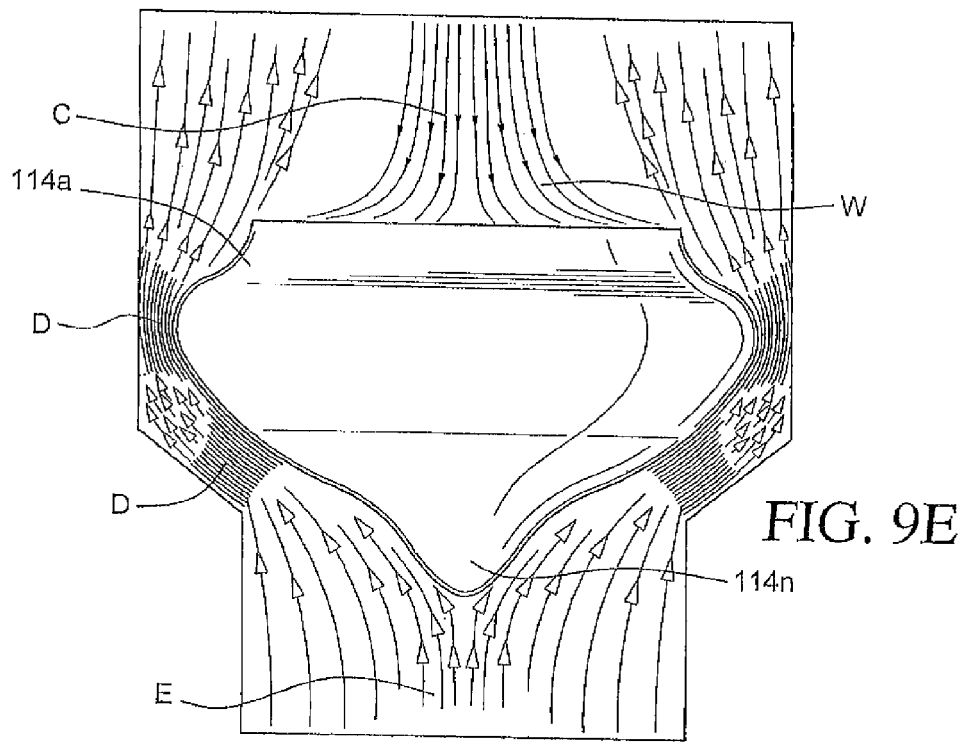
FIG. 9E is a side cross-section view of a poppet in a system according to one illustrative embodiment of the present disclosure.
Figure 10A:
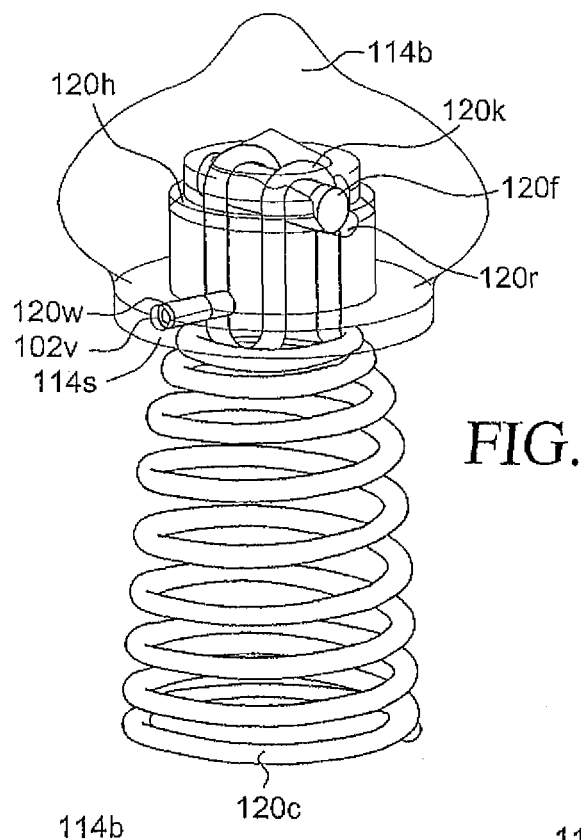
FIG. 10A is a side view of a poppet and spring for systems according to one illustrative embodiment of the present disclosure.
Figures 10B, 10C:
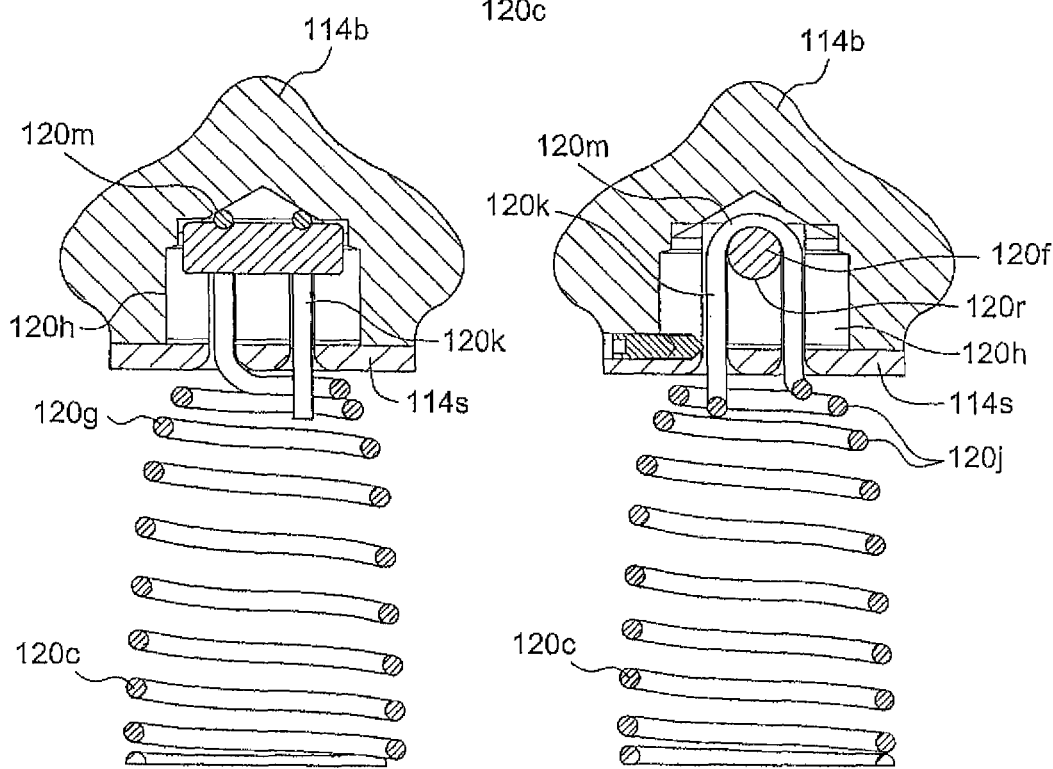
FIG. 10B is a cross-section view of the poppet and spring of FIG. 10A.
FIG. 10C is a cross-section view of the poppet and spring of FIG. 10A.

A valve assembly according to the present disclosure with a poppet like the poppet 114a provides uniform and stable poppet positioning and movement. FIG. 9D illustrates a velocity profile of incoming fluid E flowing around a poppet 114a. In FIGS. 9D and 9E, the curved surface 166 of the valve seat 160 is not depicted as a curved surface for simplicity sake. Two rings A of high velocity fluid flow surround the poppet 114a. The rings A are continuously and uniformly distributed all around the poppet 114a, creating elastic cushions B that surround and stabilize the poppet 114a, e.g. in the event of a disturbing force acting in a direction other than in an axial direction. A reverse fluid flow C (part of the flow E which has changed direction) acting on a back side of the poppet 114a tends to push the poppet 114a into the closed position shown against the incoming flow E and against the two elastic cushions B. The uniformity and distribution of the flow C also facilitate the maintenance of the poppet 114a in a stable attitude.

FIG. 9E illustrates pressure distribution of an incoming flow E around the poppet 114a. High pressure elastic fluid cushions D that surrounds and stabilize the poppet 114a. The incoming flow E has a smooth transition around the nose 114m of the poppet 114a and the ensuing flow sticks (binds to or tends to flow along adjacent a curved surface) to the curved poppet surfaces. A reverse flow C will not suffer a sudden change in direction, but a gradual one (e.g. as illustrated by the curved arrows W of the flow C at the back of the poppet). In certain prior valves such a flow hits a poppet's back surface and flows at or near a ninety degree angle to the back of the poppet. With the poppet valves disclosed herein, wobbling of the poppet 114a is reduced or eliminated and it will maintain a stable position with its vertical axis concentric with that of the tubular within which it is positioned.

In contrast, in certain prior art valve assemblies with typical plain rounded-head poppets, there are sudden ninety degree changes of fluid flow direction on both faces of the poppets. Sudden changes in the direction of fluid flow, as well as turbulence behind the poppet, can generate some flow-induced destabilizing forces. Also, with such typical plain rounded-head poppets with relatively large flat end surfaces, two areas of low pressure (vacuum or close to vacuum) are developed around sharp edges of the poppets. These areas are within and surrounded by high pressure. This pressure distribution can lead to cavitation and unstable attitude in flow. Also, discrete veins of flow can occur where these low pressure areas take place. Consequently, because of a non-uniform distribution around the body, the prior art poppets will have a precession motion. This effect is amplified by the geometrical dimensions of the poppets. Non-uniform flow distribution results on the back side of the prior art poppets.

FIGS. 10A-10D illustrate a poppet 114b on a base 114s on a spring 120c (see also FIG. 13) according to the present disclosure. The spring 120c has an end 120g with projections 120k. Optionally, there are one or three projections 120e The projections 120k have curved portions 120m which enhance freedom of movement of the poppet 114b so it can be self-centering. It is within the scope of the present disclosure to at least one, one, two, or more projections 120k.

A pin 120f rests in a recess 120r of a support 120h. The pin 120f projects through openings in the projections 120k to secure the spring 120c to the support 120h. A cable (not shown) is wrapped around (or connected to) the pin 120f and extends down through the spring 120c. A hole 120u houses a set screw 120w to secure the base 114s to support 120h.

In certain particular aspects, two first coils 120j of the spring 120c, optionally of high elasticity material allow the poppet 114b to center itself on a seat. After seating of the poppet 114b against a seat, the coils 120j are completely compressed and in contact. The remaining coils of the spring 120c take the load and thus elastically support the poppet 114b.

Figure 11A:
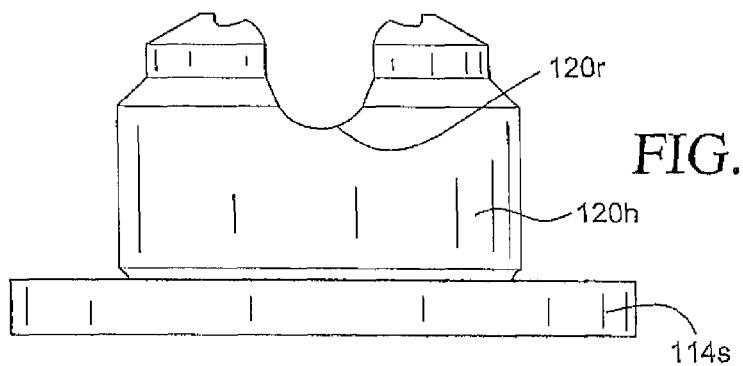
FIG. 11A is a side view of a support of the poppet of FIG. 10A.
Figure 11B:
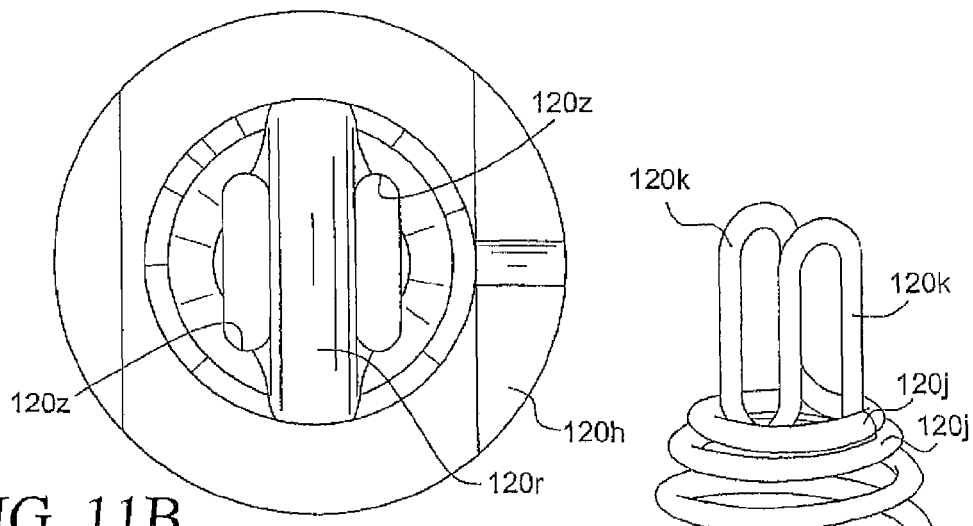
FIG. 11B is a top view of the support of FIG. 12A.
Figure 11C:
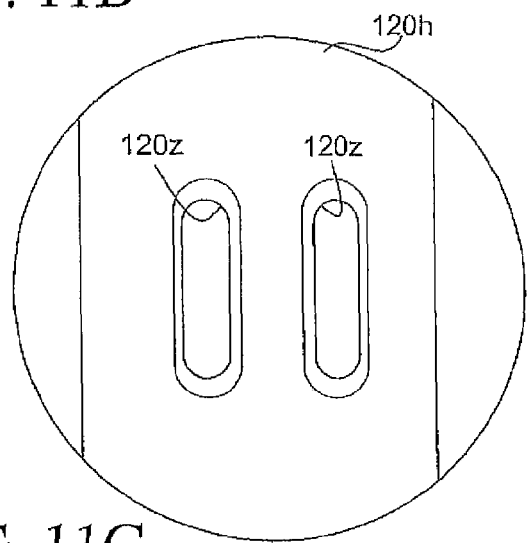
FIG. 11C is a bottom view of the support of FIG. 12A.
Figure 12:
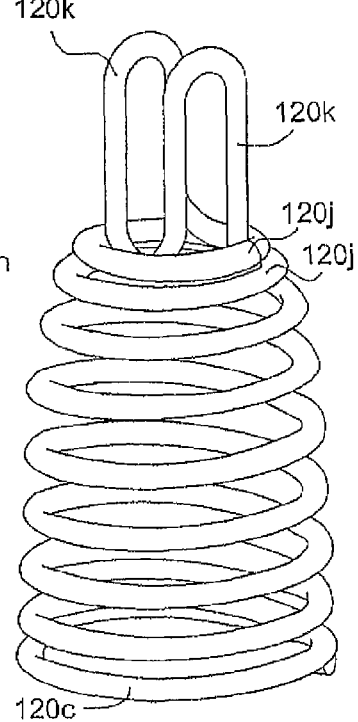
FIG. 12 is a perspective view of the spring of FIG. 10A.

The support 120h (see, e.g., FIGS. 11A-11C) has a base 120m with two holes 120z for the spring projections 120k. The projections 120k with the curved portions 120m are another means for operatively coupling the poppet 114 such that the poppet 114 has freedom of movement to facilitate sealing between the valve seat 160 and the poppet 114.

The present disclosure, therefore, provides in at least some illustrative embodiments, a valve that includes a valve body with a valve seat and a valve member adapted to sealingly engage the valve seat. The valve also includes an actuator operatively coupled to the valve member via a non-rigid connector, wherein the actuator is adapted for selectively moving the valve member relative to the valve seat.

In conclusion, therefore, it is seen that the present disclosure and the embodiments disclosed herein are well adapted to carry out the objectives and obtain the ends set forth. Certain changes can be made in the subject matter without departing from the spirit and the scope of this disclosure. It is realized that changes are possible within the scope of this disclosure and it is further intended that each element or step recited herein is to be understood as referring to the step literally and/or to all equivalent elements or steps. This specification is intended to cover the disclosure as broadly as legally possible in whatever form it may be utilized. All patents and applications identified herein are incorporated fully herein for all purposes.

What is claimed is:

1. A valve, comprising:
   a valve body;
   a valve seat disposed within said valve body;
   a valve member adapted to sealingly engage said valve seat;
   an actuator operatively coupled to said valve member via a constantly tensioned, non-rigid connector, said actuator adapted for selectively moving said valve member relative to said valve seat; and
   means for operatively and pivotably coupling said constantly tensioned, non-rigid connector to said valve member, wherein said means for operatively and pivotably coupling said constantly tensioned, non-rigid connector to said valve member comprises a ball that is at least partially positioned in a recess in said valve member, said ball being operatively coupled to said constantly tensioned, non-rigid connector.

2. The valve of claim 1, further comprising a spring adapted to urge said valve member against said valve seat.

3. The valve of claim 2, wherein said spring is substantially tapered along its axial length, a smaller end of said tapered spring being positioned proximate said valve member.

4. The valve of claim 1, wherein said actuator is pneumatically actuatable.

5. The valve of claim 4, wherein said actuator comprises an expandable hose that is operatively coupled to said non-rigid connector.

6. The valve of claim 1, wherein said constantly tensioned, non-rigid connector is a cable.

7. The valve of claim 1, wherein said valve member is a poppet.

8. The valve of claim 1, further comprising means for permitting said valve member to move relative to said ball.

9. A valve, comprising:
   a valve body;
   a valve seat disposed within said valve body;
   a poppet valve adapted to sealingly engage said valve seat;
   a spring adapted to urge said valve member against said valve seat;
   an actuator operatively coupled to said valve member via a constantly tensioned, flexible cable, said actuator adapted for selectively moving said valve member relative to said valve seat; and
   means for operatively and pivotably coupling said constantly tensioned, flexible cable to said valve member, wherein said means for operatively and pivotably coupling said constantly tensioned, flexible cable to said valve member comprises a ball that is at least partially positioned in a recess in said poppet valve, said ball being operatively coupled to said constantly tensioned, flexible cable.

10. The valve of claim 9, wherein said actuator is pneumatically actuatable.

11. The valve of claim 9, further comprising a Belleville washer positioned in said recess between said poppet valve and said ball.

12. A valve, comprising:
   a valve body;
   a valve seat disposed within said valve body;
   a poppet valve adapted to sealingly engage said valve seat;
   a spring adapted to urge said valve member against said valve seat;
   an actuator operatively coupled to said valve member via a constantly tensioned, non-rigid connector, said actuator adapted for selectively moving said valve member relative to said valve seat;
   a ball that is at least partially positioned in a recess in said poppet valve, said ball being operatively coupled to said constantly tensioned, non-rigid connector; and
   a washer positioned in said recess between said poppet valve and said ball.

* * * * *